United States Patent
Dorrestein et al.

(10) Patent No.: US 12,474,529 B2
(45) Date of Patent: Nov. 18, 2025

(54) INTERPOSER

(71) Applicant: TE Connectivity Nederland B.V., 's-Hertogenbosch (NL)

(72) Inventors: Alexander Dorrestein, Helmond (NL); Jacobus Nicolaas Tuin, Best (NL); Rutger Wilhelmus Smink, Hamont-Achel (BE)

(73) Assignee: TE Connectivity Solutions GmbH (CH)

( * ) Notice: Subject to any disclaimer, the term of this patent is extended or adjusted under 35 U.S.C. 154(b) by 148 days.

(21) Appl. No.: 16/450,189

(22) Filed: Jun. 24, 2019

(65) Prior Publication Data

US 2020/0400901 A1    Dec. 24, 2020

(51) Int. Cl.
*G02B 6/36* (2006.01)

(52) U.S. Cl.
CPC ................... *G02B 6/3628* (2013.01)

(58) Field of Classification Search
CPC .. G02B 6/3608; G02B 6/3616; G02B 6/3628; G02B 6/3636; G02B 6/3644; G02B 6/3652; G02B 6/4228
USPC ............................................. 385/77, 78, 88
See application file for complete search history.

(56) References Cited

U.S. PATENT DOCUMENTS

| | | | |
|---|---|---|---|
| 5,631,987 A | 5/1997 | Lasky | |
| 7,192,199 B2 | 3/2007 | Furuyama et al. | |
| 7,665,905 B2 | 2/2010 | Tamura et al. | |
| 9,762,329 B2 | 9/2017 | Motohara | |
| 2003/0138024 A1 | 7/2003 | Williamson | |
| 2005/0141824 A1* | 6/2005 | Furuyama | G02B 6/4249 385/89 |

(Continued)

FOREIGN PATENT DOCUMENTS

| | | |
|---|---|---|
| CN | 1637451 A1 | 7/2005 |
| CN | 101414032 A1 | 4/2009 |

(Continued)

OTHER PUBLICATIONS

Nieweglowski, Krystof et al., "Ceramic Interposer for Optoelectronic Array Devices," ISSE (International Spring Seminar on Electronics Technology) 2006, St. Marienthal, Germany, pp. 68-73.

(Continued)

*Primary Examiner* — Robert Tavlykaev (57) ABSTRACT

An optical subassembly comprising: (a) an interposer having first and second opposing sides and defining an alignment aperture extending from said first opposing side to said second opposing side, said interposer defining traces having contacts; (b) a fiber having a first optical axis, said fiber being held such that first optical axis is positioned essentially orthogonal to said first and second opposing sides; (c) at least one optical component mounted to said second opposing side and being electrically connected to at least a portion of said contacts, said at least one optical component having a second optical axis coincident with said first optical axis; and (d) a circuit board configured to receive said interposer such that said interposer is essentially orthogonal to said circuit board and said first optical axis is essentially parallel to said circuit board, said circuit board being electrically connected to at least a portion of said contacts.

8 Claims, 10 Drawing Sheets

(56) References Cited

U.S. PATENT DOCUMENTS

| | | | |
|---|---|---|---|
| 2005/0201666 A1* | 9/2005 | Terada | G02B 6/4202 385/14 |
| 2006/0215969 A1* | 9/2006 | Hamasaki | G02B 6/4249 385/89 |
| 2009/0097802 A1* | 4/2009 | Tamura | G02B 6/421 385/85 |
| 2010/0098383 A1* | 4/2010 | Koreeda | G02B 6/4284 385/88 |
| 2011/0108716 A1* | 5/2011 | Shiraishi | G02B 6/4249 250/227.24 |
| 2013/0266255 A1* | 10/2013 | Tan | G02B 6/4259 385/14 |
| 2013/0301982 A1* | 11/2013 | Lee | G02B 6/423 385/14 |
| 2013/0343711 A1* | 12/2013 | Sano | G02B 6/4214 385/88 |
| 2014/0126863 A1* | 5/2014 | Kim | H05K 3/403 385/88 |
| 2015/0318924 A1 | 11/2015 | Motohara | |
| 2018/0372968 A1 | 12/2018 | McKay et al. | |
| 2019/0086622 A1 | 3/2019 | Yamada | |
| 2019/0384013 A1* | 12/2019 | Nakagawa | G02B 6/3874 |

FOREIGN PATENT DOCUMENTS

| | | |
|---|---|---|
| CN | 104919346 A1 | 9/2015 |
| CN | 104956556 A1 | 9/2015 |
| WO | 2005057262 | 6/2005 |
| WO | WO 2005057262 A1 | 6/2005 |

OTHER PUBLICATIONS

Search Report Nov. 4, 2020 in U.S. Appl. No. 16/450,189 (counterpart of U.S. Appl. No. 16/450,189).

Office action of Oct. 8, 2021 in CN 202010580105.4 (counterpart of U.S. Appl. No. 16/450,189).

* cited by examiner

INTERPOSER

FIELD OF INVENTION

The subject matter herein relates generally to fiber optic interposers, and more particularly, to an interposer having optical features for passive alignment, direct optical coupling, and integrated electronics.

BACKGROUND

Fiber optics are used in a wide variety of applications. The use of optical fibers as a medium for transmission of digital data (including voice data) is becoming increasingly more common due to the high reliability and large bandwidth available with optical transmission systems. Fundamental to these systems are optical subassemblies (OSA) for transmitting and/or receiving optical signals. There is an ongoing need to provide simplified platforms for OSAs that simplify optics and promote passive alignment while improving optical performance. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the invention relates to an optical subassembly comprising: (a) an interposer having first and second opposing sides and defining at least one alignment aperture extending from the first opposing side to the second opposing side, the interposer defining traces having first, second, and third contacts, the first contacts being configured for electrical connection to at least one optical component, the second contacts being configured for electrical connection to at least one chip, and the third contacts being configured for electrical connection to a circuit board; (b) at least one fiber having a first optical axis, the fiber being held such that first optical axis is positioned essentially orthogonal to the first and second opposing sides; (c) the at least one optical component mounted to the second opposing side and being electrically connected to at least a portion of the first contacts, the at least one optical component having a second optical axis coincident with the first optical axis; (d) the at least one chip for operating the at least one optical component, the at least one chip being mounted on the first or second opposing side and electrically connected to at least a portion of the second contacts; and (e) the circuit board configured to receive the interposer such that the interposer is essentially orthogonal to the circuit board, the circuit board being electrically connected to at least a portion of the third contacts.

In another embodiment, the optical subassembly comprises: (a) an interposer having first and second opposing sides and defining an alignment aperture extending from the first opposing side to the second opposing side, the interposer defining traces having contacts; (b) a fiber having a first optical axis, the fiber being held such that first optical axis is positioned essentially orthogonal to the first and second opposing sides; (c) at least one optical component mounted to the second opposing side and being electrically connected to at least a portion of the contacts, the at least one optical component having a second optical axis coincident with the first optical axis; and (d) a circuit board configured to receive the interposer such that the interposer is essentially orthogonal to the circuit board and the first optical axis is essentially parallel to the circuit board, the circuit board being electrically connected to at least a portion of the contacts.

BRIEF DESCRIPTION OF DRAWINGS

FIGS. 2 a-2c show various embodiments of trace layouts of the interposer of the present invention.

DETAILED DESCRIPTION

Figure 1:
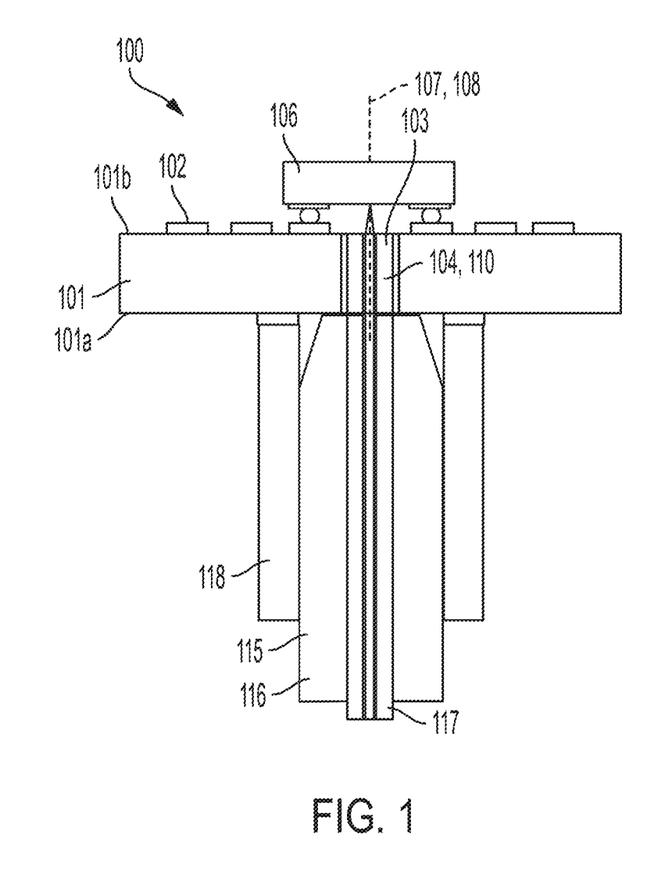
FIG. 1 shows one embodiment of the interposer of the present invention comprising a fiber stub and an optical connector configured to receive a ferrule.

Referring to FIG. 1, one embodiment of an optical subassembly (OSA) 100 of the present invention is shown. The OSA 100 comprises a fiber 104 having a first optical axis 107 and an interposer 101. The interposer has first and second opposing (e.g. parallel) sides 101a, 101b, and defines an alignment aperture 103 extending from the first opposing side to the second opposing side. In one embodiment, the alignment aperture 103 receives the fiber and holds the fiber such that the first optical axis 107 is positioned perpendicular to the first and second opposing sides.

Figure 2A:
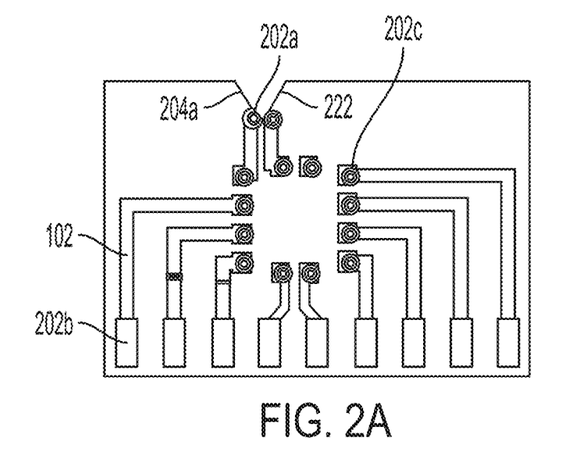
Figure 2B:
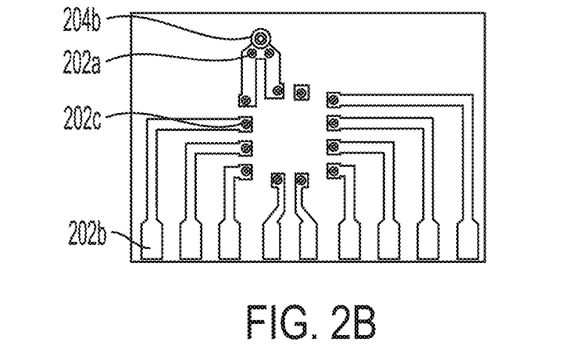
Figure 2C:
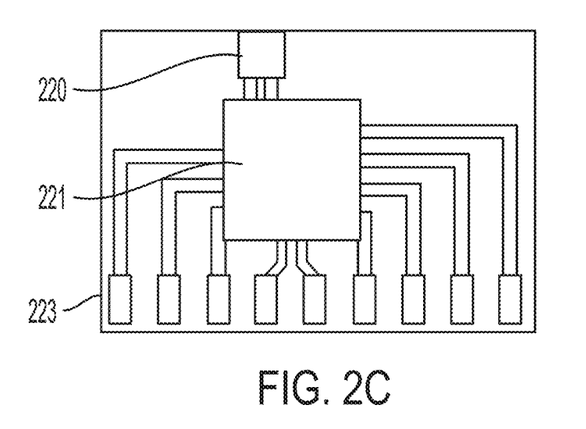

The interposer also defines traces 102 having first, second, and third contacts, 202a, 202c, 202b (see FIGS. 2a-2c). Referring to FIGS. 2a-2c, the first contact(s) 202a are configured for connection to the optical component, and, in one embodiment, are disposed about the perimeter 222 of the alignment aperture on the second opposing side. The second contact(s) 202c are configured for connection to a chip, and, in one embodiment, are disposed in the interior of the interposer. The third contact(s) 202b are configured for connection to a circuit board, and, in one embodiment, are disposed about the perimeter 223 of the interposer.

The OSA also comprises at least one optical component 106 mounted to the second opposing side and electrically connected to at least a portion of the first contacts. The optical component has a second optical axis 108 coincident with the first optical axis 107 of the fiber. The fiber 104 is directly coupled optically with the at least one optical component 106. Referring to FIG. 2c, the OSA comprises further at least one chip 221 for operating the at least one optical component 220 (106 in in FIG. 1). The chip is mounted on either the first or second opposing side and is electrically connected to at least a portion of the second contacts. It should be understood that, although the second contact(s) 202c are depicted on the second opposing side of the interposer, if the chip were mounted on the first opposing side, then at least a portion of the second contacts would be disposed on the first opposing side. Additionally, in such an embodiment, the interposer may comprise vias for connecting the traces between the first and second opposing sides.

The OSA is described below in further detail and in connection with selected alternative embodiments.

An important element of the OSA of this disclosure is the interposer. An interposer functions as a substrate for optical, opto-electrical, and electrical components and provides interconnections to optically and/or electrically interconnect the optical/opto-electrical/electrical components. Although the first and second opposing sides are parallel in specific embodiments, in other embodiments the first and second opposing sides may be non-parallel. The interposer should be rigid to support the optical and electrical components, and capable of being readily machined or etched. In one embodiment, the interposer comprises an insulating material to isolate electrical traces and contacts disposed thereon. In one embodiment, the interposer comprises a ceramic or glass. Alternatively, the interposer may comprise a semiconductor such as silicon. In one embodiment, the interposer comprises a material having essentially the same coefficient of expansion (COE) as the optical component and chip disposed thereon. (Silicon and ceramic have similar COEs.) By matching the COE of the interposer to the components mounted thereon, the OSA is stable over a wide temperature range. This is particularly beneficial in applications in which sterilizing the OSA may be required such as in medical applications.

One feature of one embodiment of the interposer is an alignment aperture to align the fiber such that the fiber's optical axis is precisely positioned in the interposer and essentially orthogonal/perpendicular to the interposer. As used herein, the term essentially orthogonal/perpendicular means about 90°, not precisely 90° but for example 90°+/− 5° or so. In one embodiment, the aperture is configured to hold the fiber in a precise position relative to the interposer, thereby facilitating passive alignment of the fiber with respect to the optical component. Passive alignment is generally preferred as it facilitates manufacturability (as opposed active alignment which requires energizing the optical components and then aligning optical components to optimize optical coupling).

The alignment aperture may have different embodiments. For example, in FIG. 2a, the interposer is shown with a V-groove 204a for aligning the optical fiber. V-grooves are well-known for providing precise alignment for optical elements having a round cross-section such as an optical fiber. Referring to FIG. 2b, an alternative embodiment is shown in which the alignment aperture is a borehole 204b. Although the V-groove and borehole are disclosed herein, it should be understood that other alignment aperture configurations can be used, including, for example, any polygon shape providing at least three points of contact with the fiber (e.g., a square aperture, hexagon aperture, etc.).

In another embodiment, the alignment aperture is configured as a ferrule receiver or as a receptacle to receive a plug containing the fiber. In one embodiment, the first opposing side of the interposer may comprise a structure for inter-engaging mechanically with the plug. Although not shown, such a configuration may involve a ferrule receiver 118 such as that shown in FIG. 1 (and described below) and a connector comprising a ferrule from which a fiber protrudes so as to be received in the alignment aperture. Alternatively, the aperture may be configured to receive a ferrule containing a fiber. Those of skill in the art will appreciate other suitable alignment aperture configurations in light of this disclosure.

In addition to the alignment aperture, other alignment features may be used such as alignment holes/alignment pins for ferrules (e.g. MT ferrules) or for aligning components on/under the interposer as in known to those of skill in the art in light of this disclosure.

Figure 6:
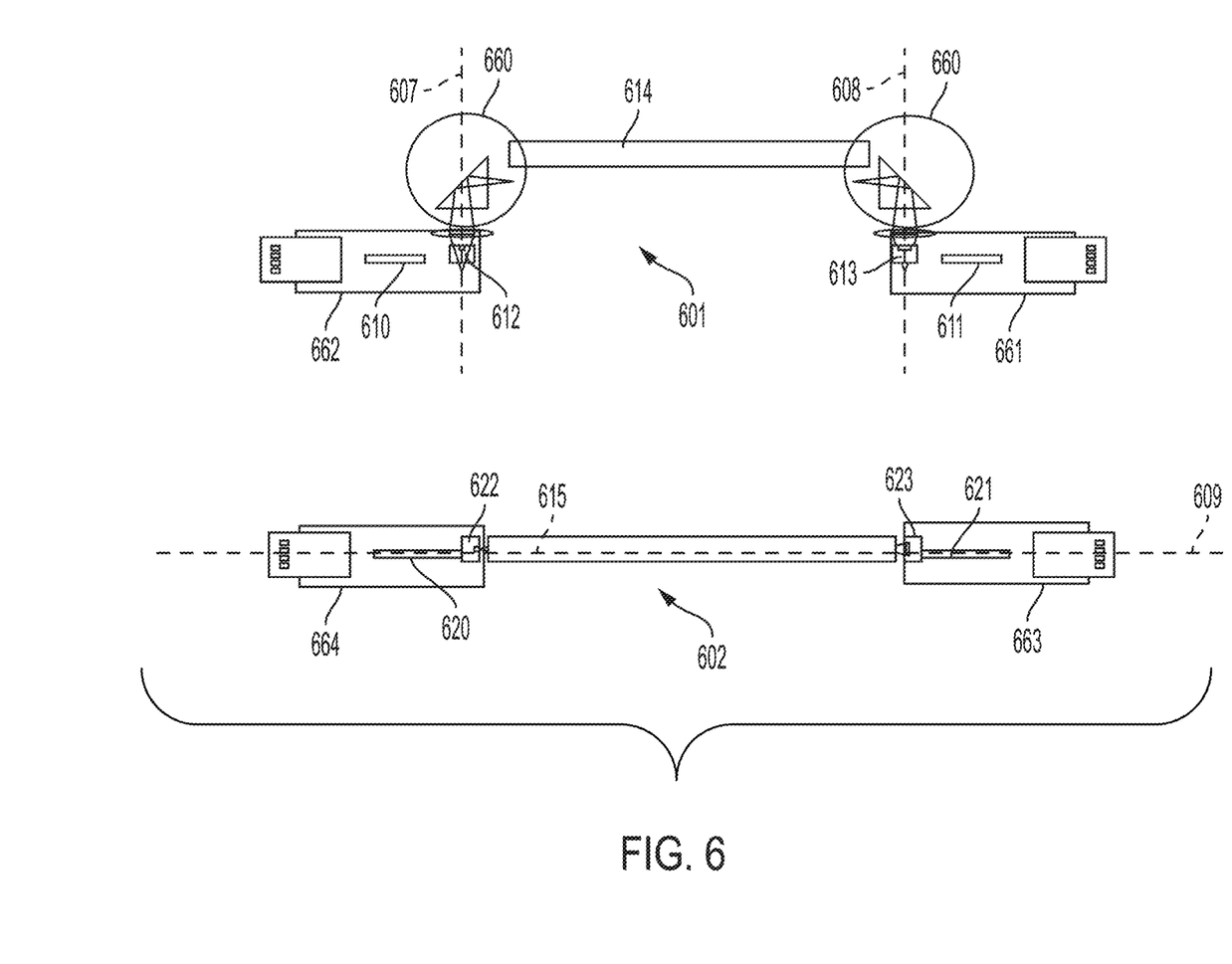
FIG. 6 compares the optical connection between prior art OSAs involving periscope optics and the optical connection between OSAs comprising the interposer of the present invention.

Another feature of one embodiment of the invention is direct coupling between the optical fiber and the optical component. As used herein, direct coupling means no light bending between the optical axis of the fiber and the optical axis of the optical component. Accordingly, in a direct coupling, there are no intervening optics/reflective/refractive surfaces to change the direction of light propagation between the optical axis of the fiber and the optical axis of the optical component. In other words, unlike many conventional OSAs, the OSA of the present invention does not have reflective surfaces between the fiber and the optical component. Such an embodiment simplifies manufacturing and provides a more robust/high integrity optical path between optical components of different OSAs. For example, referring to FIG. 6, a conventional interconnection 601 between a transmitter 662 and a receiver 661 is shown. In this conventional interconnection, light bending 660 is required to change the direction of light propagation from the optical components 612, 613 of the OSAs to the fiber 614. The optical axes 607, 608 of the optical components 612, 613 are orthogonal/perpendicular to the OSAs' circuit boards 610, 611 and fiber 614, requiring periscope optics or light bending 660 to turn the light. No such light bending is required in the interconnection 602 of the present invention. Here, the transmitter 664 and the receiver 663 have optical components 622, 623 having an optical axis 609 which is essentially parallel to the circuit boards 620, 621 and coincident with the optical axis of the optical fiber 615.

The direct coupling between the fiber in the optical component may have different embodiments. For example, in one embodiment, the optical fiber is butt coupled to the optical component as shown in FIG. 1. A butt coupled interface provides a high integrity/low loss optical coupling. In one embodiment, the butt coupled interface involves physically contacting the end face of the optical fiber with the optical component. In another embodiment, no physical contact is made between the fiber end face and the optical component, thereby defining an airgap therebetween, as shown, for example in FIG. 1. In such an embodiment, it may be beneficial to use an antireflective coating to reduce Fresnel losses. In yet another embodiment, it may be beneficial to use an expanded beam coupling between the fiber and the optical component. For example, in one embodiment, a gradient-index (GRIN) lens is disposed between the fiber end face and the optical component. Alternately, a converging lens may be formed on the fiber end face or otherwise disposed near the end face for focusing light. Still other embodiments will be known to those of skill in the art in light of this disclosure.

Another feature of one embodiment of the present invention is the disposition of both the optical component and the electronic chip needed to operate the optical component on the interposer. As used herein, the optical component may be any known or later-developed component that can be optically coupled to an optical conduit as described below. The optical component may be for example: (a) an optoelectric device (OED), which is an electrical device that sources, detects and/or controls light (e.g., lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); photodiodes, such as P Intrinsic N (PIN) and avalanche photodiode (APD); photonics processor, such as, a complementary metal oxide semiconductor (CMOS) photonic processor, for receiving optical signals, processing the signals and transmitting responsive signals, electro-optical memory, electro-optical random-access memory (EO-RAM) or electro-optical dynamic random-access memory (EO-DRAM), and electro-optical logic chips for managing optical memory (EO-logic chips)); or (b) a hybrid device which does not convert optical energy to another form but which changes state in response to a control signal (e.g., switches, modulators, attenuators, and tunable filters). It should also be understood that the optical component may be a single discrete device or it may be assembled or integrated as an array of devices. In one embodiment, the optical component is a surface emitting light source. In one embodiment, the surface emitting light source is a VCSEL. In one embodiment, the optical component is photo sensitive. In one embodiment, the photo sensitive optical component is a photodiode.

In one embodiment, the optical component works in conjunction with one or more electronic chips. A chip as used herein refers to any electronic/semiconductor chip needed to facilitate the function of the optical component. For example, if the optical component is a transmitter, then the chip may be a driver, or, if the optical component is a receiver, then the chip may be a transimpedance amplifier (TIA). The required chip for a given optical component is well known in the art will not be described here in detail.

As mentioned above, one feature of the claimed invention is disposing both the optical component and its associated chip on the interposer. That is, rather than disposing the chip on the circuit board and electrically connecting the chip with the optical component on the interposer as is done conventionally, here, in one embodiment, the transmitter/receiver chip is disposed on the interposer in close proximity to the optical component. Such a configuration has a number of important benefits. First, because the chip is in close proximity to the optical component, the traces between the chip and the optical component are very short which facilitates high speed operation by reducing impedance. Additionally, disposing the chip on the interposer eliminates the need to place it on the circuit board where space is typically limited due to the need to reduce circuit board size.

The placement of the chip(s) on the interposer may be configured in different ways. In one embodiment, the chip is disposed on the same side as the optical component—i.e. the second side. Such configuration has the benefit of simplicity since the optical component of the chip can be electrically connected via surface traces alone. Alternatively, the chip may be disposed on the first side of the interposer—i.e., on the opposite side of the optical component. Such a configuration has the benefit of utilizing space on the first opposing side of the interposer which may be important if space on the second opposing side of the interposer is limited. In this embodiment, vias may be required to connect the chip on the first opposing side to its respective optical component on the second opposing side.

The configuration of the optical component(s) on the interposer may vary. For example, in one embodiment, the interposer comprises just a transmit or receive optical component. In this embodiment, the OSA may be part of a dedicated transmitter or receiver. Alternatively, the interposer may comprise both transmit and receive optical components and the OSA may be part of a transceiver. In this embodiment, the optical components may be disposed separately on the interposer, or, in one embodiment, they may be disposed in series. For example, referring to FIG. 7, one embodiment of the optical components in series is shown. In this embodiment, the interposer 701 defines an alignment aperture through which optical fiber 704 is disposed. A transmitting optical component 771 is disposed adjacent the optical fiber 704. A second optical component, for example, a receiving optical component 772, may be disposed on the interposer such that its optical axis is coincident with that of the transmitting optical component 771. In this particular embodiment, the receiving optical component 772 is behind the transmitting optical component 771, and thus, the signal received by the receiving optical component 772 passes through the transmitting optical component 771. This requires that the optical components be configured such that the transmitting optical component is essentially transparent to the received signal. Those of skill in the art will understand how to configure the transmitting optical component to be essentially transparent to the received signal in light of this disclosure. (See, for example, FIG. 8 and associated text.)

Figure 7:
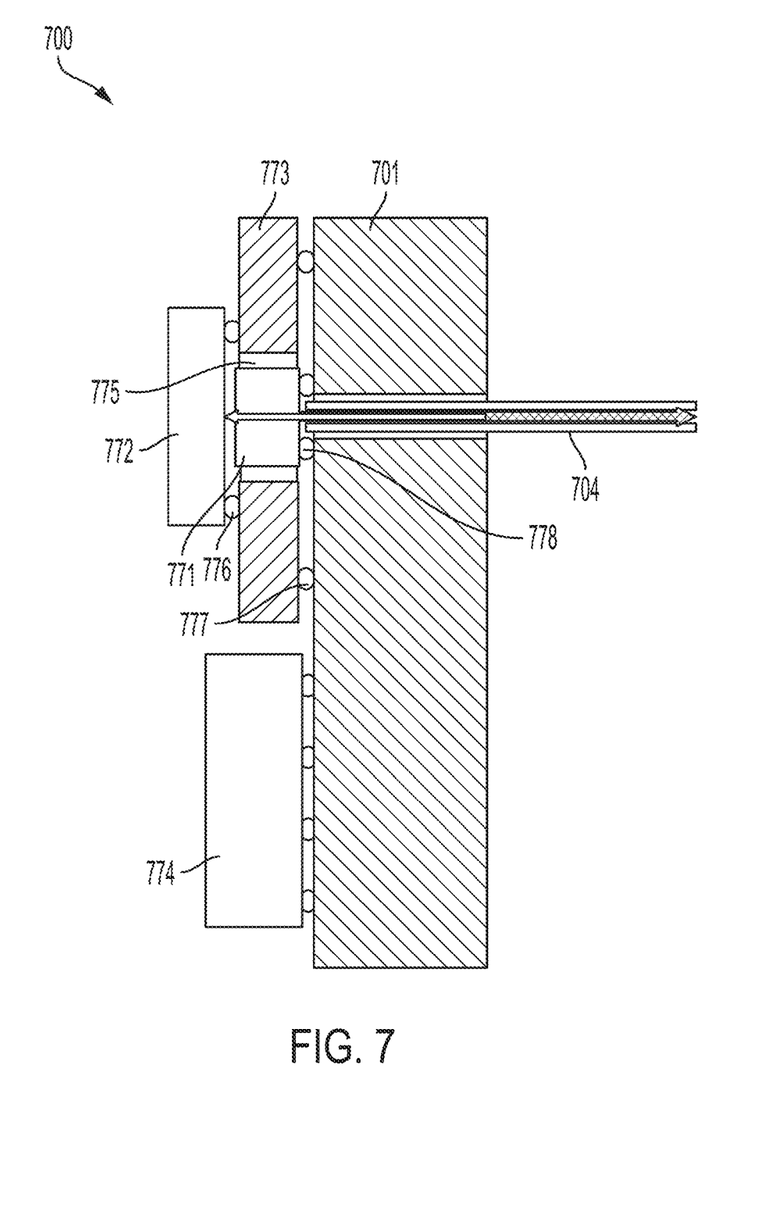
FIG. 7 shows another embodiment of the interposer of the present invention comprising axially aligned optical components.
Figure 8:
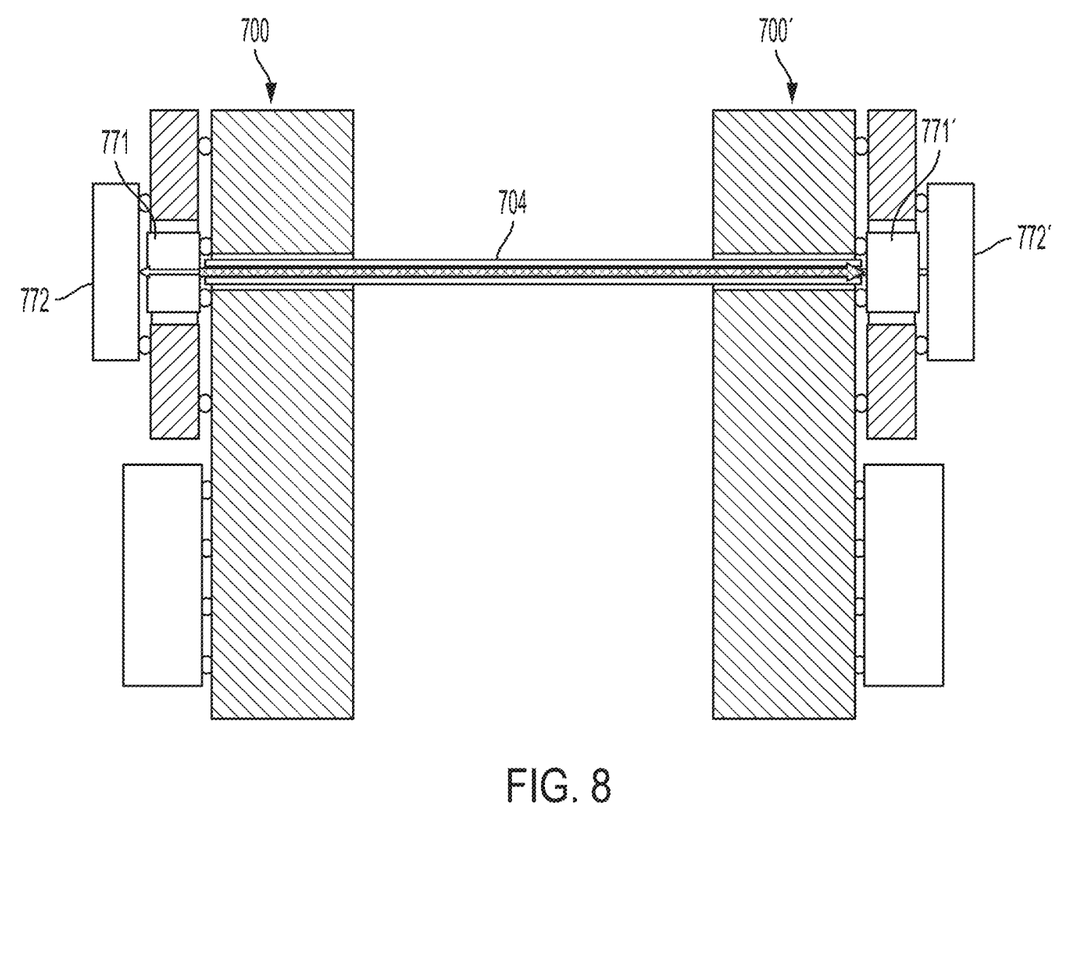
FIG. 8 shows the optical connection between interposers of FIG. 7.

As shown in FIG. 7, the receiving optical component 772 is mounted on a second interposer 773. The second interposer 7073 comprises traces/contacts 776, 777 that electrically connect the receiving optical component 772 with the traces on the interposer 701. Separate contacts 778 are provided for electrically connecting the transmitting optical component 771 with its respective chip. As shown, in this embodiment, a chip 774 is disposed on the substrate which can be configured to operate one or more of the optical components. The advantage of this configuration is that both the transmitting and receiving optical components are disposed on a single interposer and are coupled to a single fiber.

Figure 9:
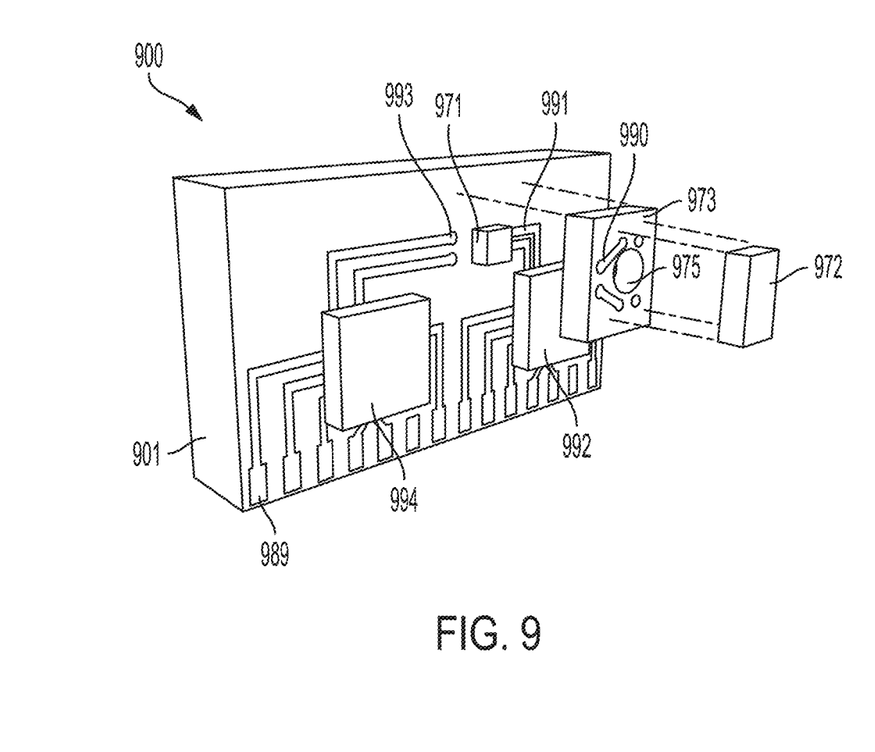
FIG. 9 shows an exploded view of the interposer embodiment of FIG. 7.

Referring to FIG. 9, the concept of the interposer of FIG. 7 is shown in an exploded view of OSA 900 similar to OSA 700. As shown, a transmitting optical component 971 is disposed on interposer 901. Traces 991 connect the transmitting optical component 971 with its associated chip 992. The receiving optical component 972 is disposed over the transmitting optical component 971 and supported by the second interposer 973. The second interposer 973 has an orifice 975 to accommodate/receive the transmitting optical component 971. The second interposer 973 also has traces 990 and vias (not shown) which are configured to interface with traces 993 to connect the receiving optical component 972 to its associated chip 994. As with the other interposer embodiments, third contacts 989 are disposed along the perimeter of the interposer for contact with corresponding circuit board contacts.

The transceiver embodiment of OSA 700 simplifies installations. For example, referring to FIG. 8, a schematic is shown in which the OSA 700 of FIG. 7 is connected to another OSA 700' via optical fiber 704. As mentioned above, such a connection does not require any additional optics/light bending to facilitate contact between optical connection between the two OSAs. Moreover, the OSAs 700, 700' facilitate bi-directional communication over a single fiber 704 according to a specific embodiment. For example, in one embodiment, the receiving optical components 772, 772' of the OSAs 700, 700' are sensitive over a broad range, which also covers the wavelength of the transmitting optical components 771, 771'. The transmitting optical component 771, 771' transmit at different wavelengths, wherein the transmitting optical component 771 is transparent at the transmitting wavelength of the transmitting optical component 771', and the transmitting optical component 771' is transparent at the transmitting wavelength of the transmitting optical component 771. For example, in one embodiment, the transmitting optical component is essentially transparent to received light having a wavelength around 1310 nm. In this embodiment, the transmitted signal may have a significantly shorter wavelength, e.g., around 850 nm. This way, the receiving optical component 772 can receive the signal from the transmitting optical component 771', even though the transmitting optical component 771 is right in front of it because the transmitting optical component 771 is transparent to the signal from the transmitting optical component 771' (and vice versa).

Still other embodiments are possible, for example, in one embodiment, the chip is integrated with the optical component. In such an embodiment, it should be understood that there would not be any traces between the optical component and the chip as shown in FIGS. 2A and 2B.

The fiber's integration into the OSA of the present invention may have different embodiments. For example, referring to FIG. 1, a fiber stub is shown disposed in the borehole of the interposer. Such an embodiment facilitates manufacturing as discussed in more detail with respect to FIG. 10.

In another embodiment, the interposer comprises a ferrule-receiving fixture disposed on the first opposing side to receive a connector 115. In one embodiment, the ferrule-receiving fixture 118, such as a fiber alignment sleeve, has an axis coincident with the first optical axis and being configured to receive a ferrule 116 containing a terminated fiber 117 such that the terminated fiber optically couples with the fiber stub in interposer 101.

Alternatively, rather than a fiber stub, the alignment aperture may be configured to receive a longer length of fiber or even be configured as a connector to receive a plug. For example, referring to FIG. 7, another embodiment of the fiber is shown in which the interposer does not have a fiber stub but instead has a longer length of a fiber that is disposed in the interposer and extends beyond the side of the interposer. In still another embodiment, the fiber is terminated in a ferrule, which is then disposed in the interposer. In yet another embodiment, multiple fibers may be disposed in the interposer for a multifiber connection to the optical component(s). In this regard, although a single-fiber ferrule is shown in FIG. 1, it should be understood that a multi-fiber ferrule, such as the MT ferrule, may be used in the interposer of the present invention according to other embodiments.

In one embodiment, one end of the optical fiber extends from the first opposing side 101a freely. In other words, although one end of the optical fiber may be held in a ferrule or borehole, the other end extends freely from the interposer allowing it to be bundled/routed as need be. For example, referring to FIG. 7, the fiber 704 extends freely from the first opposing side of the interposer, allowing the fiber to be routed or terminated as need be. For example, in the embodiment of FIG. 8, the fiber 704 from OSA 700 is terminated in another OSA 700 as described below.

The interposer of the present invention facilitates a variety of different OSA packaging configurations. First, because the optical component(s) and associated chips are disposed on an interposer and are not distributed between an interposer and a circuit board (as is traditionally done), the interposer of the present invention tends to be more modular, affording greater flexibility in manufacturing and packaging configurations. For example, the interposer may be disposed essentially orthogonal/perpendicular to a circuit board or parallel to the circuit board, depending on the application. As mentioned above, in one embodiment, the interposer comprises contacts along the perimeter of the interposer to facilitate connection to the circuit board. Although locating the second contacts along the perimeter of the interposer is preferred as it provides a convenient connection location to the circuit board, it should be understood that other embodiments exist. For example, island type connectors can be used to connect the interposer to a circuit board.

Figure 3:
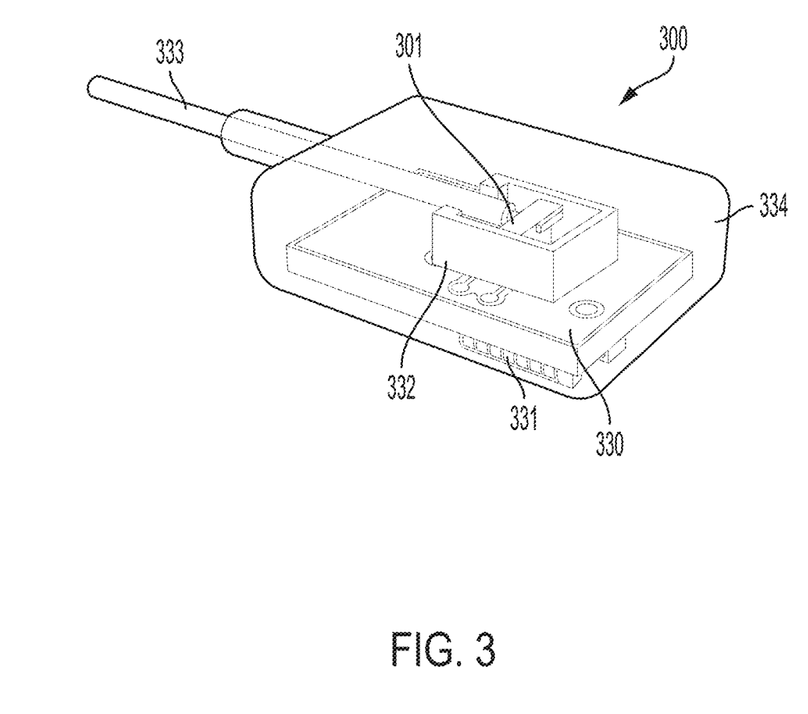
FIG. 3 shows one embodiment of the interposer of the present invention packaged in a plug.
Figure 4:
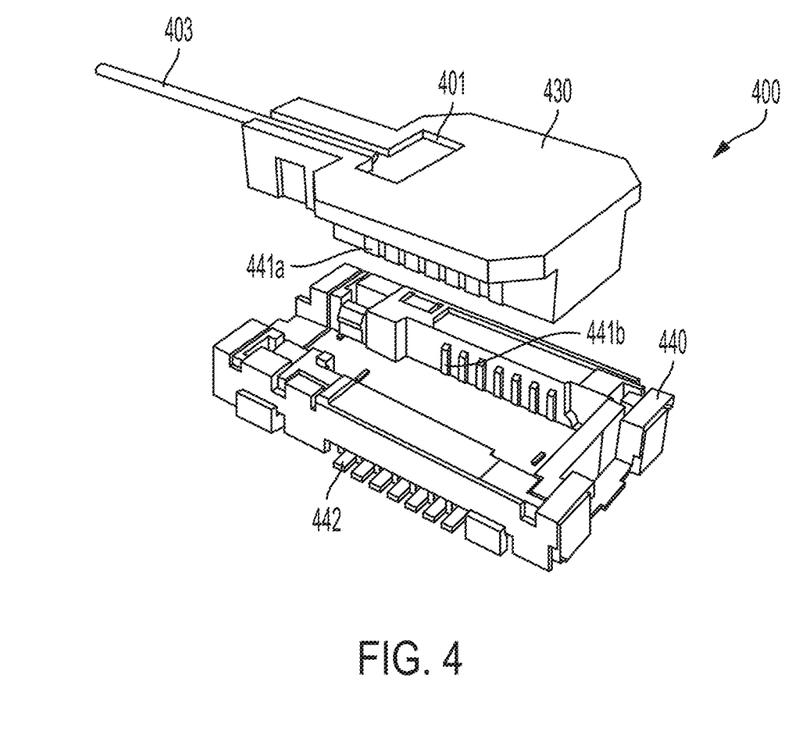
FIG. 4 shows a plug embodiment of the invention along with a socket to receive the plug.
Figure 5:
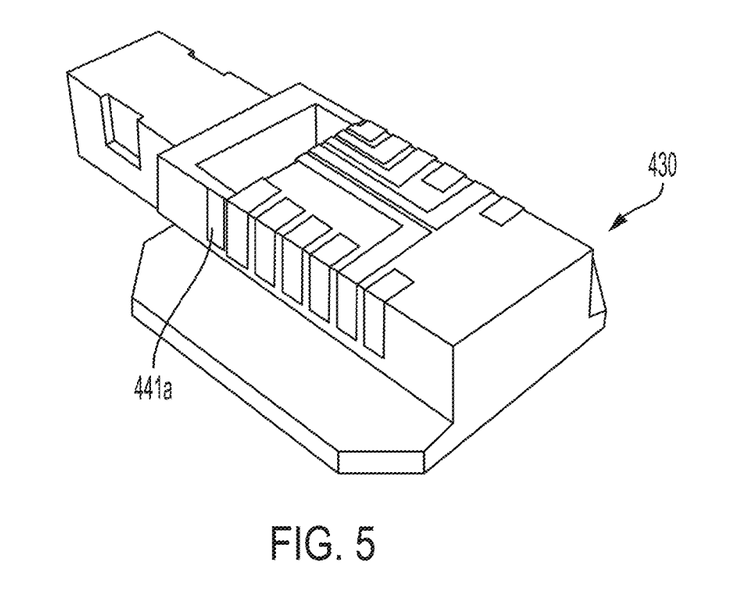
FIG. 5 shows the bottom side of the plug of FIG. 4.

According to specific embodiments of the invention, the OSA may be embodied as a plug as or it may be integrated in a motherboard or backplane connector assembly. For example, referring to FIG. 3, one embodiment of a OSA plug 300 is shown. In this embodiment, the interposer 301 is disposed essentially orthogonal/perpendicular on a printed circuit board 330. The fiber 333 extends from the plug such that its optical axis is essentially parallel with the printed circuit board. As described above with respect to FIG. 6, such an embodiment simplifies connections between OSAs, thereby minimizing additional components and signal losses. Referring back to FIG. 3, in this embodiment, the plug also comprises a potting structure 332 to contain the potting material which, in one embodiment, is applied over the interposer. In this embodiment, a soft overmold 334 is also applied to the assembly to facilitate handing and protect the circuit board. In this embodiment, a plug interface 331 is provided on the bottom of the plug. Referring to FIGS. 4 and 5, according to another embodiment, a plug assembly 400 similar to the plug 300 is shown. Here, the plug 430 contains the interposer 401 of the present invention with the fiber 703 extending essentially parallel to the circuit board as described above. On the bottom of the plug 430 are contacts 441a that are configured for connection to corresponding contacts 441b of a socket 440 as shown in FIG. 4. The socket 440 comprises circuit board contacts 442 for contacting corresponding contacts on a circuit board. FIG. 5 shows the bottom side of plug 430 and the various traces and contacts for interfacing with the socket 440. It should be understood that this plug embodiment is just one embodiment of many packages in which the interposer may be used.

Figure 10:
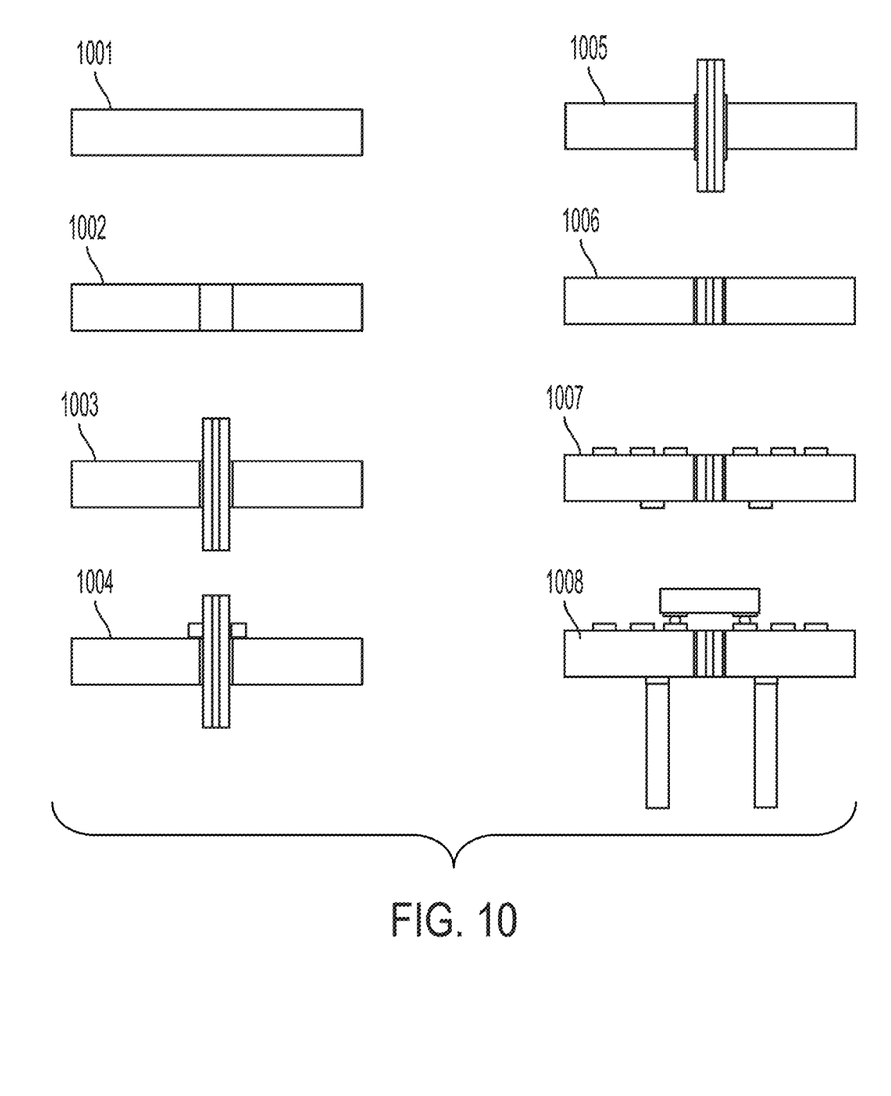
FIG. 10 shows one embodiment of preparing the interposer of FIG. 1.

Referring to FIG. 10, one embodiment of the process for preparing the interposer in FIG. 1 is shown. In step 1001, an insulating substrate such as a ceramic wafer is provided. In step 1002, the alignment aperture is defined in the wafer. In this particular embodiment, the alignment aperture is a borehole which may for example be drilled through the wafer. In step 1003, a fiber stub is inserted in the borehole. In step 1004, a fritt ring is disposed between the fiber and the borehole to center the fiber in the borehole. In step 1005, the wafer is heated such that the fritt ring melts and flows into the borehole between the fiber and the wafer thereby holding the fiber in place. Next, in step 1006, the fiber is polished on both sides to be essentially flush with the first and second opposing sides of the wafer as shown. It should be noted that for some embodiments of the interposer, such as shown in FIG. 7, this step 1006 could be omitted where the fiber stub of FIG. 1 is not applicable.

In step 1007, trace, contacts, and other features are deposited on the either side of the wafer as shown. It should be noted that, in this deposition step, not only are traces/contacts for the optical components/chips deposited, but also, in this embodiment, a connection for the female connector 118 is defined. Having these critical elements defined in the same deposition process is not only efficient, but also improves precision by avoiding tolerance buildup which can result from multiple deposition steps. In step 1008, the optical components/and associated chip are disposed on the contacts on the interposer, and a ferrule-receiving structure is added to the opposite side of the interposer. It should be understood, that this is only one embodiment of preparing interposer of the present invention. Those of skill in the art will appreciate many variations are possible within the scope of the invention.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. An optical subassembly comprising:
   an interposer, said interposer being rigid and planar, and having first and second opposing sides and defining at least one alignment aperture extending from said first opposing side to said second opposing side, said interposer defining traces having first, second, and third contacts, said first contacts being configured for electrical connection to at least one optical component, said second contacts being configured for electrical connection to at least one chip, and said third contacts being configured for electrical connection to a circuit board;
   a fiber having a first optical axis, wherein said fiber is disposed at least partially in said alignment aperture to hold said fiber such that said first optical axis is positioned essentially orthogonal to said first and second opposing sides, said fiber extending from said interposer;
   said at least one optical component mounted to said second opposing side and being electrically connected to at least a portion of said first contacts, said at least one optical component having a second optical axis coincident with said first optical axis;
   said at least one chip for operating said at least one optical component, said at least one chip being mounted on said first or second opposing side and electrically connected to at least a portion of said second contacts; and
   said circuit board configured to receive said interposer such that said interposer is essentially orthogonal to said circuit board, said circuit board being electrically connected to at least a portion of said third contacts.

2. The optical subassembly of claim 1, wherein said first contacts are disposed about a perimeter of said alignment aperture on said second opposing side, said second contacts are disposed in an interior of said interposer, and said third contacts are disposed about a perimeter of the interposer.

3. The optical subassembly of claim 2, wherein said first contacts and a portion of said second contacts are electrically connected by a portion of said traces such that said at least one optical component and said chip are electrically connected directly by said portion of said traces.

4. The optical subassembly of claim 1, wherein said first contacts and a portion of said second contacts are electrically connected by a portion of said traces such that said at least one optical component and said chip are electrically connected directly by said portion of said traces.

5. An optical subassembly comprising:
   an interposer, said interposer being rigid and planar, and having first and second opposing sides and defining at least one alignment aperture extending from said first opposing side to said second opposing side, said interposer defining traces having first, second, and third contacts, said first contacts being configured for electrical connection to at least one optical component, said second contacts being configured for electrical connection to at least one chip, and said third contacts being configured for electrical connection to a circuit board;
   a fiber having a first optical axis, wherein said fiber is disposed at least partially in said alignment aperture to hold said fiber such that said first optical axis is positioned essentially orthogonal to said first and second opposing sides, said fiber extending from said interposer;
   at least one optical component mounted to said second opposing side and being electrically connected to at least a portion of said contacts, said at least one optical component having a second optical axis coincident with said first optical axis; and
   said at least one chip for operating said at least one optical component, said at least one chip being mounted on said first or second opposing side and electrically connected to at least a portion of said second contacts.

6. The optical subassembly of claim 5, wherein said contacts comprise first contacts disposed about the perimeter of said alignment aperture on said second opposing side for electrical connection to said at least one optical component, second contacts disposed in the interior of said interposer for electrical connection to said at least one chip, and third contacts disposed about the perimeter of the interposer for electrical connection to said circuit board.

7. The optical subassembly of claim 6, wherein said first contacts and a portion of said second contacts are electrically connected by a portion of said traces such that said at least one optical component and said chip are electrically connected directly by said portion of said traces.

8. The optical subassembly of claim 5, wherein said first contacts and a portion of said second contacts are electrically connected by a portion of said traces such that said at least one optical component and said chip are electrically connected directly by said portion of said traces.

* * * * *